United States Patent
Wempen et al.

(10) Patent No.: US 8,694,982 B2
(45) Date of Patent: Apr. 8, 2014

(54) DYNAMIC SOFTWARE CONFIGURATION

(75) Inventors: Paul Wempen, Owatonna, MN (US);
Jayadeven Maniyullavalappil,
Owatonna, MN (US)

(73) Assignee: Bosch Automotive Service Solutions LLC, Warren, MI (US)

(*) Notice: Subject to any disclaimer, the term of this patent is extended or adjusted under 35 U.S.C. 154(b) by 1605 days.

(21) Appl. No.: 11/902,707

(22) Filed: Sep. 25, 2007

(65) Prior Publication Data

US 2008/0104583 A1 May 1, 2008

Related U.S. Application Data

(60) Provisional application No. 60/855,140, filed on Oct. 30, 2006.

(51) Int. Cl.
*G06F 9/44* (2006.01)
(52) U.S. Cl.
USPC .................... 717/168; 717/170; 717/175
(58) Field of Classification Search
USPC ............... 717/168–178; 701/29, 33, 35, 701/29.1–34.4; 709/204, 220, 250
See application file for complete search history.

(56) References Cited

U.S. PATENT DOCUMENTS

| | | | | |
|---|---|---|---|---|
| 4,404,639 A * | 9/1983 | McGuire et al. | | 701/29.3 |
| 6,134,659 A * | 10/2000 | Sprong et al. | | 713/190 |
| 6,715,108 B1 * | 3/2004 | Badger et al. | | 714/38.1 |
| 6,845,275 B2 * | 1/2005 | Gasiorek et al. | | 700/26 |
| 6,874,680 B1 * | 4/2005 | Klaus et al. | | 235/375 |
| 7,050,892 B1 | 5/2006 | Liebl et al. | | |
| 7,539,868 B2 * | 5/2009 | Balard et al. | | 713/176 |
| 7,865,891 B2 * | 1/2011 | Saito | | 717/170 |
| 2005/0090942 A1 * | 4/2005 | Shi | | 701/1 |
| 2005/0097541 A1 * | 5/2005 | Holland | | 717/168 |
| 2006/0064426 A1 * | 3/2006 | Barsness et al. | | 707/100 |
| 2007/0010922 A1 * | 1/2007 | Buckley | | 701/29 |
| 2007/0240146 A1 * | 10/2007 | Chinnadurai et al. | | 717/168 |

OTHER PUBLICATIONS

Song You, Mark Krage and Laci Jalics; Overview of Remote Diagnosis and Maintenance for Automotive Systems; SAE International, 2005; pp. 1-10.*

Lenz et al., Customized Software for Distributed Control; aquired from http://21stcenturytime.net/yahoo_site_admin/assets/docs/VDI_2004_Jensen-Lenz.147120225.pdf; pp. 1-6.*

* cited by examiner

*Primary Examiner* — Satish Rampuria
(74) *Attorney, Agent, or Firm* — Baker & Hostetler LLP

(57) ABSTRACT

A method and apparatus are provided that allow the user to quickly load new versions of applications on a scan tool. The latest versions of the applications that a scan tool can operate are loaded onto a memory device. The scan tool verifies which versions of the applications are authorized and allows the scan tool to only access information related to the authorized versions.

14 Claims, 5 Drawing Sheets

DYNAMIC SOFTWARE CONFIGURATION

CROSS-REFERENCE TO RELATED APPLICATIONS

This application claims priority to provisional U.S. patent application entitled, "Dynamic Software Configuration," filed Oct. 30, 2006, having a Ser. No. 60/855,140, the disclosure of which is hereby incorporated by reference in its entirety.

FIELD OF THE INVENTION

The present invention relates generally to software updating. More particularly, the present invention relates to software updating for a vehicle diagnostic device.

BACKGROUND OF THE INVENTION

Automobile diagnostic tool, such as scan tools are used to diagnosis problems with a vehicle. The scan tool is linked to the vehicle's computer via a data link connector (DLC). Once linked, the scan tool can query the vehicle's computers or electronic control units (ECU) with the appropriate vehicle communication protocols and collect vehicle diagnostic data. Once collected, the diagnostic data can be displayed on the display so that a technician can make the appropriate diagnosis.

Software on the scan tool allows the scan tool to diagnosis the vehicle. The software can include applications to diagnose vehicles from various manufacturers, including manufactures from various countries, such as Japan and Germany. Information about the vehicles operating parameters, various fault codes, various ECUs in the car, test procedures, schematics, diagrams and other information are contained in the software. This software is updated periodically, such as yearly or every other year with new vehicles information or other changes by the manufacturers or industry. The user normally loads all the applications that can be used on the scan tool, such as USA domestic 2006, European 2006 and ABS/AIRBAG 2004, into a memory device, such as a CF (compact flash) card coupled to a computing device, such as a personal computer. Then the memory device is coupled to the scan tool, where the applications are available to the scan tool. Then the scan tool verifies which applications are authorized and deletes the applications or versions that the user is not authorized to have from the CF card. This process consumes much of the user's time.

Accordingly, it is desirable to provide a process that decrease the update time when updating software on the scan tool.

SUMMARY OF THE INVENTION

The foregoing needs are met, to a great extent, by the present invention, wherein in one aspect a method is provided that in some embodiments allows the user to quickly update software on a scan tool by loading the latest version of the applications and allowing access to authorized versions of the applications.

In accordance with one embodiment of the present invention is a method of updating software on a vehicle diagnostic tool, which can include loading available versions of applications that the diagnostic tool can operate onto a portable flash memory device, transferring the available versions of the applications onto a diagnostic tool memory, authorizing versions of the applications that have been purchased by a user, verifying which versions of the applications are authorized for the diagnostic tool, and allowing access to only the authorized versions of the applications on the diagnostic tool.

In accordance with another embodiment of the present invention is a method of updating diagnostic applications on a vehicle scan tool, which can include providing a diagnostic software having previous and current versions of the diagnostic applications that are configured to operate on the scan tool, loading the software onto a memory of the scan tool, updating a previous diagnostic software on the scan tool, purchasing at least one version of the diagnostic application contained in the software, unlocking the at least one version of the diagnostic application in order to be used on the scan tool, and allowing access to the at least one version of the diagnostic application that has been unlocked.

In accordance with yet another embodiment of the present invention, a vehicle diagnostic tool is provided, which can include a processor that can be operably coupled to a vehicle diagnostic connector to diagnose a vehicle, at least one vehicle communication protocol interface operatively coupled to the processor and allows the processor to communicate with the vehicle, a memory operably coupled to the processor, a diagnostic software having previous and current versions of diagnostic applications and operable by the processor, wherein the diagnostic scan tool can only access authorized versions of the diagnostic applications and the software is stored in the memory, a display that displays icons of authorized applications, a user interface that can by used by a user and operably coupled to the processor, and a housing surrounding the processor, the at least one vehicle communication protocol interface, the memory, the display and the user interface, wherein the housing has a port configured to couple to a computing device.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
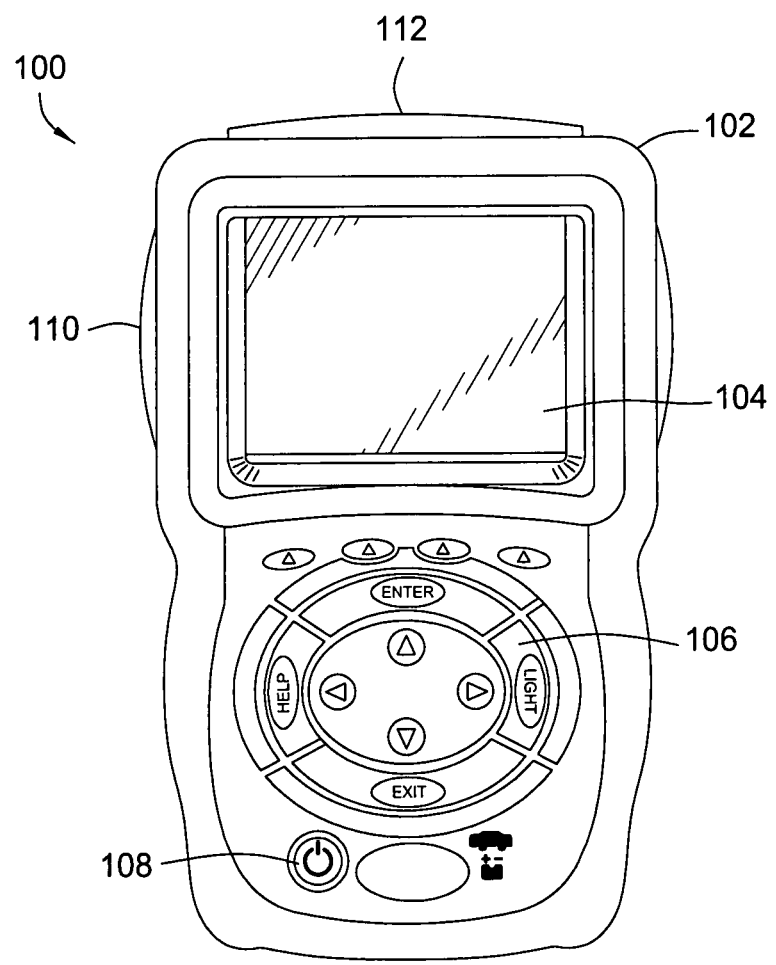
FIG. 1 is a front view of a scan tool that can use the updating method according to an embodiment of the invention.

The invention will now be described with reference to the drawing figures, in which like reference numerals refer to like parts throughout. An embodiment in accordance with the present invention allows a user to update the software on the scan tool by loading the latest versions of the applications and then allowing the scan tool to have access to the authorized versions of the applications.

FIG. 1 is a front view of a scan tool 100 that can use the updating method according to an embodiment of the invention. The scan tool 100 can be any computing device, such as, for example, the Nemisys scan tool from Service Solutions (a unit of the SPX Corporation) in Owatonna, Minn. The scan tool 100 includes a housing 102 to house the various components of the scan tool, such as a display 104, a user interface 106, a power key 108, a memory card reader 110 and a connector interface 112. The display 104 can be any display, for example, LCD (liquid crystal display), VGA (video graphics array), touch display (can also be a user interface), etc. The user interface 106 allows the user to interact with the scan tool in order to operate the scan tool as desired. The user interface 106 can include function keys, arrow keys or any other type of keys that can manipulate the scan tool 100 in order to operate various menus that are presented on the display. The input device 106 can also be a mouse or any other suitable input device, including a keypad. The user interface 106 can also include numbers or be alphanumeric. The power key 108 allows the user to turn the scan tool 100 on and off, as required.

Memory card reader 110 can be a single type card reader, such as a compact flash card, floppy disc, memory stick, secure digital, other types of flash memory or other types of memory. The software update stored on a flash memory can be inserted into the memory card reader 110 in order to load the software update on the scan tool. The memory card reader 110 can be a reader that reads more than one of the aforementioned memory such as a combination memory card reader. Additionally, the card reader 110 can also read any other computer readable medium, such as CD, DVD, UMD, etc.

The connector interface 112 allows the scan tool 100 to connect to an external device, such as an ECU (electronic control unit) of a vehicle through the adaptive cable described herein, a computing device, an external communication device (such as a modem), a network, etc. through a wired or wireless connection. Connector interface 112 can also include a USB, FIREWIRE, modem, RS232, RS48J, and other connections to communicate with external devices, such as a hard drive, USB flash memory device, CD player, DVD player, UMD player or other computer readable medium devices.

Figure 2:
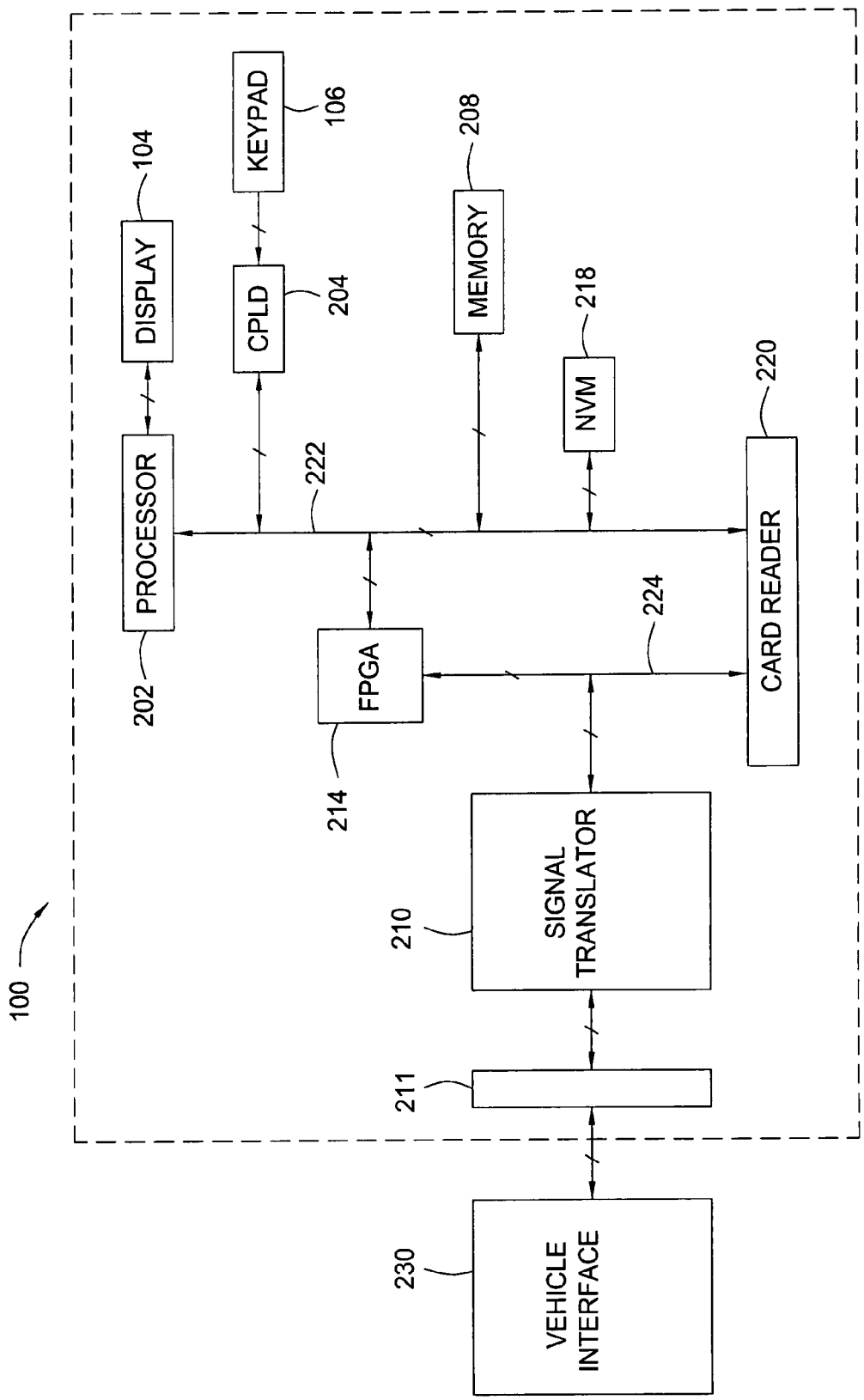
FIG. 2 is a block diagram of the components of the scan tool of FIG. 1.

FIG. 2 is a block diagram of the components of the scan tool 100 of FIG. 1. In FIG. 2, the scan tool 100 according to an embodiment of the invention includes a processor 202, a field programmable gate array (FPGA) 214, a first system bus 224, the display 104, a complex programmable logic device (CPLD) 204, the user interface in the form of a keypad 106, a memory subsystem 208, an internal non-volatile memory 218, a card reader 220, a second system bus 222, a connector interface 211, and a selectable signal translator 210. A vehicle communication interface 230 is in communication with the scan tool 100 through connector interface 211 via an external cable (not shown).

Selectable signal translator 210 communicates with the vehicle communication interface 230 through the connector interface 211. Signal translator 210 conditions signals received from an ECU unit through the vehicle communication interface 230 to a conditioned signal compatible with scan tool 100. Signal translator 210 can communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, a solenoid drive, J1708, RS232, Controller Area Network (CAN), Keyword 2000 (ISO 14230-4) or other communication protocols that are implemented in a vehicle.

The circuitry to translate and send in a particular communication protocol can be selected by FPGA 214 (e.g., by tri-stating unused transceivers) or by providing a keying device that plugs into the connector interface 211 that is provided by scan tool 100 to connect scan tool 100 to vehicle communication interface 230. Signal translator 210 is also coupled to FPGA 214 and the card reader 220 via the first system bus 224. FPGA 214 transmits to and receives signals (i.e., messages) from the ECU unit through signal translator 210.

The FPGA 214 is coupled to the processor 202 through various address, data and control lines by the second system bus 222. FPGA 214 is also coupled to the card reader 220 through the first system bus 224. The processor 202 is also coupled to the display 104 in order to output the desired information to the user. The processor 202 communicates with the CPLD 204 through the second system bus 222. Additionally, the processor 202 is programmed to receive input from the user through the user interface 106 via the CPLD 204. The CPLD 204 provides logic for decoding various inputs from the user of scan tool 100 and also provides glue-logic for various other interfacing tasks.

Memory subsystem 208 and internal non-volatile memory 218 are coupled to the second system bus 222, which allows for communication with the processor 202 and FPGA 214. Memory subsystem 208 can include an application dependent amount of dynamic random access memory (DRAM), a hard drive, and/or read only memory (ROM). Software that operates the basic functions of the scan tool 100 can be stored in the memory subsystem 208, while the software to operate the diagnostic functions of the scan tool can be stored on an external memory device, such as a CF card. In other embodiments of the invention, the diagnostic software can be stored internally on the scan tool.

Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 214, memory 218 can contain downloadable images so that FPGA 214 can be reconfigured for a different group of communication protocols.

Figure 3A:
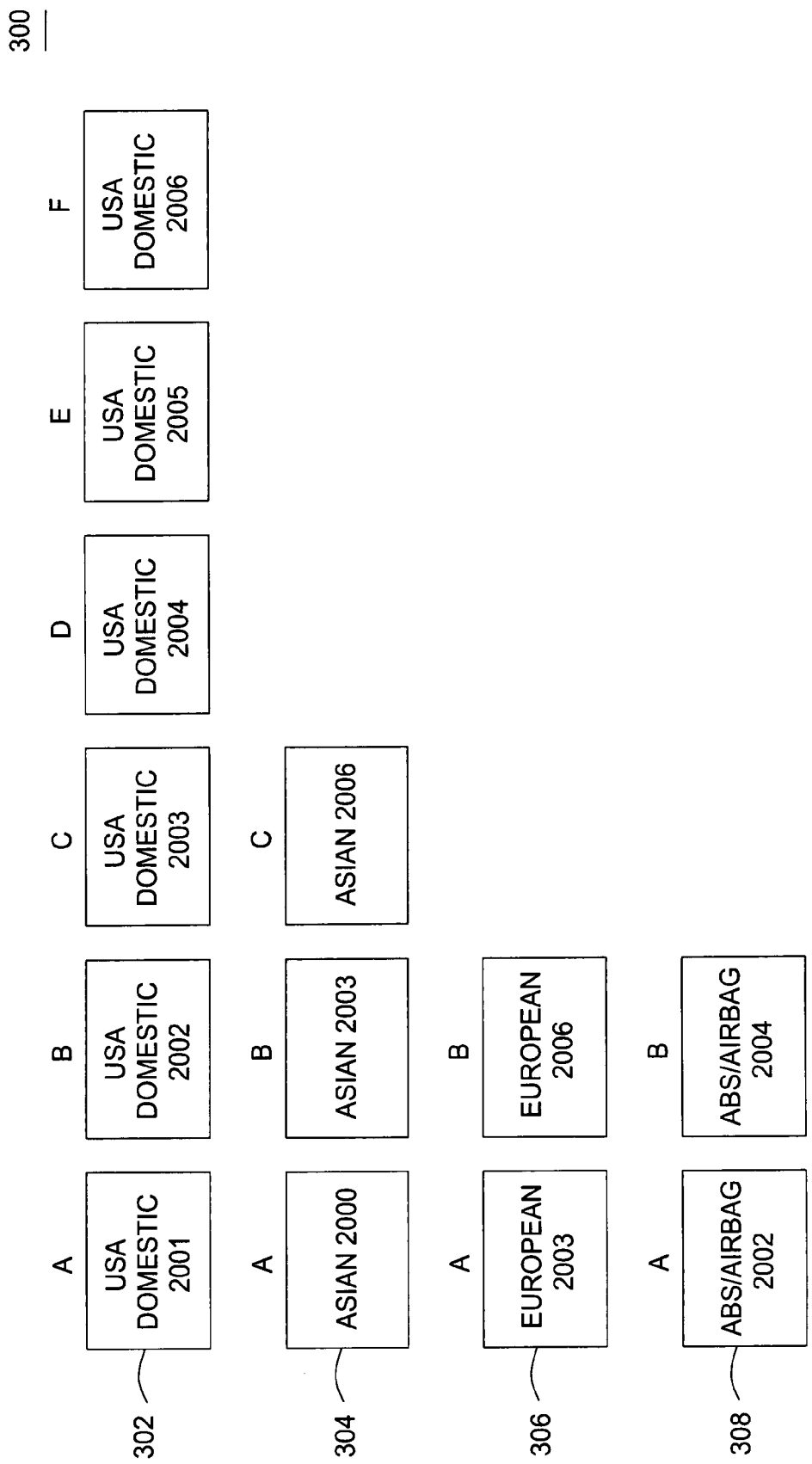
FIG. 3A illustrates software that include various applications that may be loaded on a flash memory device.

FIG. 3A illustrates software that include various applications that may be loaded on a flash memory device. Conventionally, the software can contain applications for domestic vehicles, such as USA Domestic 302. However, the software loaded on the flash memory device will also include other versions such as USA Domestic 2001 (302A), USA Domestic 2002 (302B), USA Domestic 2003 (302C), USA Domestic 2004 (302D), USA Domestic 2005 (302E), and USA Domestic 2006 (302F). Similarly, the software can contain applications for Asian vehicles 304, including other versions such as Asian 2000 (304A), Asian 2003 (304B) and Asian 2006 (304C). Further, the software can contain applications for European vehicles 306, including other versions such as European 2003 (306A) and European 2006 (306B). The software can also contain applications for ABS/Airbag 308, including other versions such as ABS/Airbag 2002 (308A) and ABS/Airbag 2004 (308B). As previous stated, if the USA Domestic application has a 2006 version available for updating, all of the previous versions (2001-2005) of that application would have to be reloaded onto the CF card by the personal computer. Then the CF card is transferred to the scan tool where the unauthorized versions will be deleted by the scan tool. Thus, conventional updates take a long period of time.

Figure 3B:
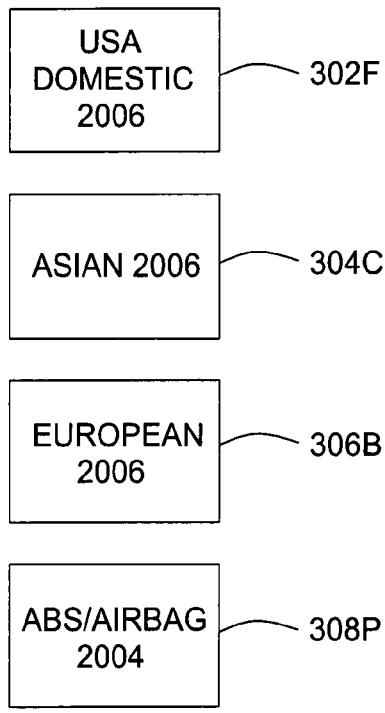
FIG. 3B illustrates a software update according to an embodiment of the invention.

FIG. 3B illustrates a software update according to an embodiment of the invention. In one embodiment, the CF card can be loaded with the latest versions of the applications that the scan tool can utilized. For example, based on the applications illustrated in FIG. 3A, the CF card may contain software for USA domestic 2006 (302F), Asian 2006 (304C), European 2006 (306B), and ABS/Airbag 2004 (308B). A person skilled in the art recognizes that other software diagnostic applications can also be load and these are but examples. Once loaded, the scan tool can verify what versions of the applications are authorized for the scan tool. The scan tool can verify the authorization based on a security card that can be supplied with the software that contains the applications. The security card will only allow the scan tool access to the authorized versions of the applications (as further described below). Such security card system is disclosed in U.S. Pat. No. 7,050,892 assigned to SPX Corporation and is incorporated herein in its entirety. Other methods of authorization are contemplated including authorization through entering information, bar-code, telephonic, web-based means and others.

Figure 4:
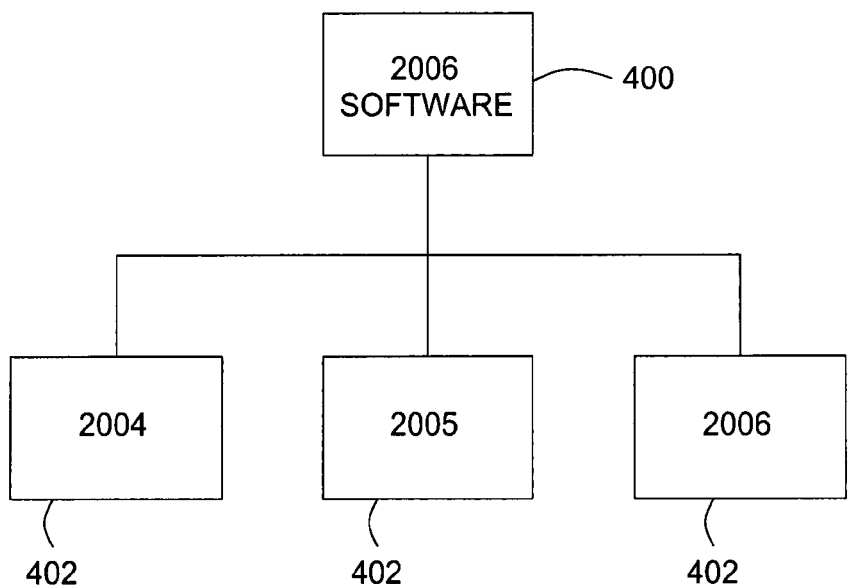
FIG. 4 illustrates a software update according to an embodiment of the invention.

FIG. 4 illustrates a software update according to an embodiment of the invention. As described in above, the 2006 application 400 or the latest application can be loaded onto the CF card for use. The 2006 application 400 can include diagnostic information and data for 1980-2006 vehicles. Within that 2006 application 400, diagnostic information and data can be divided into different versions including the latest and the previous versions of that application. For example, 2006 application 400 can be written so that if the scan tool is authorized to access a particular version and that associated version's diagnostic information and data, then the scan tool will only be allowed access to the information and data related to that version only. Thus, if the scan tool is only authorized for the 2004 application version 402, then the scan tool will only be allowed to access diagnostic information and data related to that version. In other words, access to diagnostic information and data related to vehicles from 1980-2004 will be allowed, while the 2005-2006 information will not be available or is hidden from the user. Similarly, if the scan tool is only authorized for the 2005 application version 404, then access to information related to vehicles from 1980-2005 will be allowed, while the 2006 information will not be available or is hidden from the user. Additionally, if the scan tool is authorized for the latest version, then access to diagnostic information and data related to vehicles from 1980-2006 is allowed. Thus, the scan tool will only allow the user to access the version he would have had even though only the latest application version is loaded on the CF card.

Figure 5:
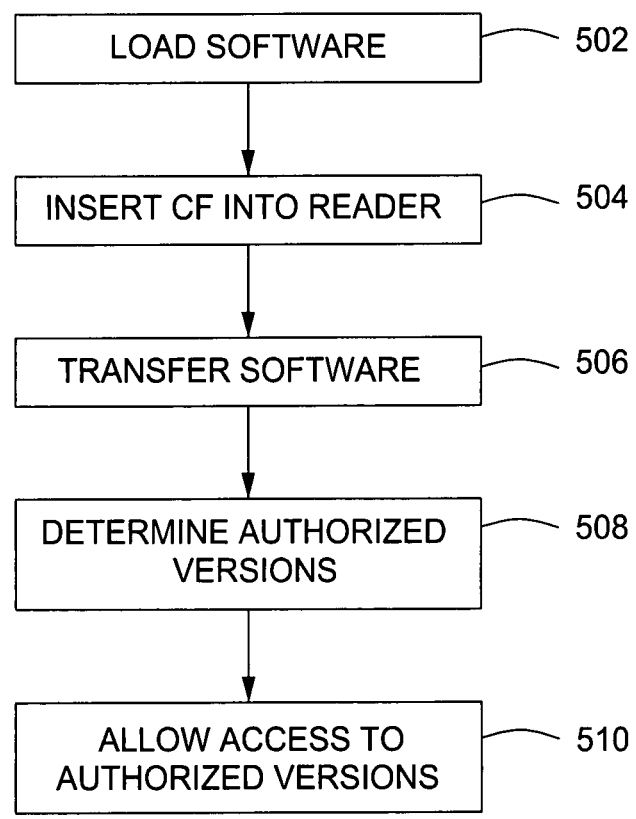
FIG. 5 illustrates the method of updating according to an embodiment of the invention.

FIG. 5 illustrates the steps 500 of updating software on the scan tool according to an embodiment of the invention. At step 502, the software is loaded on a CF card from a computing device. The CF card can be in communication with the computing device by being inserted into a CF card reader. The software contains all of the available versions of the applications that can be used on the scan tool. At step 504, the CF card is inserted into the CF card reader on the scan tool. At step 506, the software is transferred or copied to a memory in the scan tool. At step 508, the scan tool can determine which of the versions of the various applications are authorized for the scan tool. At step 510, the authorized versions of the software are verified and allowed to be accessed by the scan tool. The scan tool can be programmed to only display the authorized applications and versions of the applications or can be programmed so that the unauthorized applications and/or versions are "grey out" or have a "lock" symbol associated with it. The applications and their respective versions can be represented by previously programmed icons.

The invention does not require that the user reload all the versions of the applications and then deleted, but rather, the latest versions of the applications can be loaded and then access to the diagnostic information and data are restricted to the authorized versions. Additionally, the method allows the user to purchase any of the versions that have been loaded on the scan tool. For example, if the user decides that he would like the scan tool to be authorized for a 2006 version of an application, all he has to do is purchase the application and the application can be authorized and be immediately available for use. Thus, the embodiments described herein not only saves time by not requiring the scan tool to delete any unauthorized versions, but also allows for immediate purchase and access to any versions of the available software.

Although the software described herein can be loaded onto a CF card and then transferred to the scan tool for loading, the software can also be loaded onto the scan tool via wired or wireless connection. The scan tool described herein can be equipped with wireless communication circuitry in order to enable the wireless transfer including Wi-Fi, cellular, satellite, Wi-Max and other wireless communication protocols.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of updating software on a vehicle diagnostic tool, comprising:
   storing a plurality of available versions of one or more vehicle diagnostic applications for domestic and foreign vehicles on a diagnostic tool memory, the vehicle scan tool memory including previously available versions of the one or more vehicle diagnostic applications for domestic and foreign vehicles;
   updating at least one previously available version of the stored one or more vehicle diagnostic applications for domestic and foreign vehicles using the plurality of currently available versions of said one or more vehicle diagnostic applications for domestic and foreign vehicles stored on the vehicle scan tool memory;
   purchasing versions of the updated at least one previously available version of the one or more vehicle diagnostic applications for domestic and foreign vehicles stored on the vehicle scan tool memory;
authorizing the purchased versions of the one or more vehicle diagnostic applications for domestic and foreign vehicles stored onto the diagnostic tool memory for use by the diagnostic tool;
displaying on a display of the diagnostic tool both the authorized purchased versions of the one or more vehicle diagnostic applications for domestic and foreign vehicles stored onto the diagnostic tool memory and unauthorized versions of the one or more vehicle diagnostic applications for domestic and foreign vehicles stored on the diagnostic tool memory, wherein the unauthorized versions of the one or more vehicle diagnostic applications for domestic and foreign vehicles are greyed out or include a lock icon; and
allowing access to the authorized versions of the one or more vehicle diagnostic applications for domestic and foreign vehicles stored on the diagnostic tool memory, while not allowing access to the unauthorized versions of the one or more applications stored onto the diagnostic tool memory of the diagnostic tool.

2. The method of claim 1, wherein the plurality of available versions of the one or more vehicle diagnostic applications for domestic and foreign vehicles stored on the diagnostic tool memory include all previous versions and all of the latest versions for a vehicle's model.

3. The method of claim 1, wherein the storing step further comprises loading the plurality of available versions of the one or more vehicle diagnostic applications for domestic and foreign vehicles onto the diagnostic tool memory via a wired or wireless connection with a remote computing device prior to the purchasing of the available version of the one or more vehicle diagnostic applications.

4. The method of claim 1, wherein the diagnostic tool memory is a compact flash card and the diagnostic tool is a vehicle diagnostic scan tool.

5. The method of claim 1, wherein the authorization of the purchased versions of the one or more vehicle diagnostic applications for domestic and foreign vehicles stored on the diagnostic tool memory is done via a security card system or the Internet.

6. The method of claim 1, further comprising:
allowing access to each of the versions that are previous to the authorized version of the one or more vehicle diagnostic applications for domestic and foreign vehicles based on the authorization.

7. A method of updating a diagnostic application on a vehicle scan tool, comprising:
storing a plurality of currently available versions of one or more vehicle diagnostic applications for domestic and foreign vehicles on a vehicle scan tool memory, the vehicle scan tool memory including previously available versions of the one or more vehicle diagnostic applications for domestic and foreign vehicles;
updating at least one previously available version of the stored one or more vehicle diagnostic applications for domestic and foreign vehicles using the plurality of currently available versions of said one or more vehicle diagnostic applications for domestic and foreign vehicles stored on the vehicle scan tool memory;
purchasing versions of the updated at least one previously available version of the one or more vehicle diagnostic applications for domestic and foreign vehicles stored on the vehicle scan tool memory;
unlocking purchased versions of the updated at least one previously available version of the one or more vehicle diagnostic applications for domestic and foreign vehicles stored on the vehicle scan tool memory;
displaying on a display of the vehicle scan tool both icons correlated to the unlocked purchased versions of the updated at least one previously available version of the one or more vehicle diagnostic applications for domestic and foreign vehicles stored onto the diagnostic tool memory and the locked versions of the one or more vehicle diagnostic applications for domestic and foreign vehicles stored on the vehicle scan tool memory, wherein the icons correlated to the locked versions of the vehicle diagnostic applications for domestic and foreign vehicles are greyed out or include a lock icon; and
allowing access to the unlocked versions of the one or more vehicle diagnostic applications for domestic and foreign vehicles, while not allowing access to the locked versions of the one or more applications included in the vehicle scan tool memory.

8. The diagnostic tool of claim 1, wherein the available versions of the one or more vehicle diagnostic applications for domestic and foreign vehicles are further authorized based on a vehicle's model.

9. The method of claim 7, further comprising:
allowing access to each of the versions that are previous to the authorized version of the one or more vehicle diagnostic applications for domestic and foreign vehicles.

10. The method of claim 7, wherein the storing step further comprises:
loading the plurality of currently available versions of the one or more vehicle diagnostic applications for domestic and foreign vehicles onto the vehicle scan tool memory via a wired or wireless connection with a remote computing device.

11. A vehicle diagnostic tool, comprising:
a processor with at least one vehicle communication protocol interface operatively coupled to the processor that allows the processor to communicate with a vehicle for diagnosis;
a memory of the vehicle diagnostic tool operably coupled to the processor, the memory configured to store a plurality of available versions of one or more vehicle diagnostic applications for domestic and foreign vehicles, the vehicle scan tool memory including previously available versions of the one or more vehicle diagnostic applications for domestic and foreign vehicles; and
a housing surrounding the processor, the at least one vehicle communication protocol interface, the memory, a display, and a user interface, wherein the processor is configured to:
update at least one previously available version of the stored one or more vehicle diagnostic applications for domestic and foreign vehicles using the plurality of currently available versions of said one or more vehicle diagnostic applications for domestic and foreign vehicles stored on the vehicle scan tool memory;
purchase versions of the updated at least one previously available version of the one or more vehicle diagnostic applications for domestic and foreign vehicles stored on the vehicle scan tool memory;
unlock purchased versions of the updated at least one previously available version of the one or more vehicle diagnostic applications for domestic and foreign vehicles stored on the vehicle scan tool memory;
display on a display of the vehicle scan tool both icons correlated to the unlocked purchased versions of the undated at least one previously available version of the one or more vehicle diagnostic applications for domestic and foreign vehicles stored onto the diagnostic tool memory and the locked versions of the one or more vehicle diagnostic applications for domestic and foreign vehicles stored on the vehicle scan tool memory, wherein the icons correlated to the locked versions of the vehicle diagnostic applications for domestic and foreign vehicles are greyed out or include a lock icon; and allow access to the unlocked versions of the one or more vehicle diagnostic applications for domestic and foreign vehicles, while not allowing access to the locked versions of the one or more applications included in the vehicle scan tool memory.

12. The diagnostic tool of claim 11, wherein the authorization occurs via a security card system or Internet.

13. The diagnostic tool of claim 11, wherein the storing of the available versions of the one or more vehicle diagnostic applications for domestic and foreign vehicles onto the memory is done via a wired or wireless connection with a remote computer.

14. The diagnostic tool of claim 11, wherein the available versions of the one or more vehicle diagnostic applications for domestic and foreign vehicles are transferred to the memory via a flash memory device.

* * * * *